March 26, 1929.  T. F. BOWLER  1,707,208
DEMOUNTABLE WHEEL RIM
Filed March 1, 1927   2 Sheets-Sheet 1

INVENTOR.
THOMAS F. BOWLER,
BY Ralph D. Barrett
ATTORNEY.

March 26, 1929.     T. F. BOWLER     1,707,208
DEMOUNTABLE WHEEL RIM
Filed March 1, 1927     2 Sheets-Sheet 2
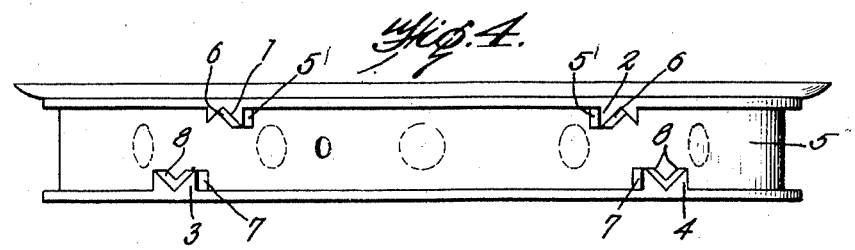
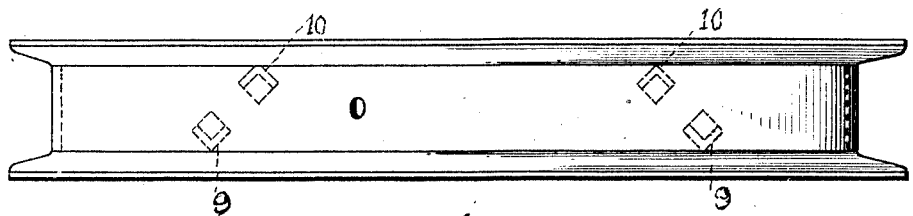
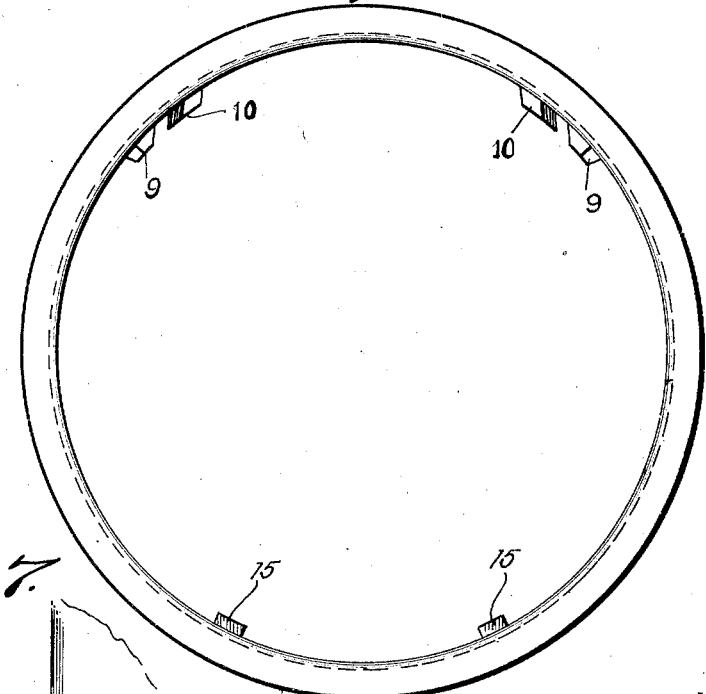
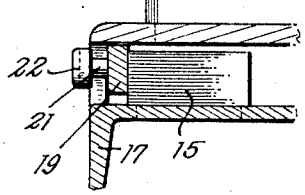
INVENTOR.
Thomas F. Bowler,
BY
ATTORNEY.

Patented Mar. 26, 1929.

1,707,208

UNITED STATES PATENT OFFICE.

THOMAS F. BOWLER, OF BOISE, IDAHO, ASSIGNOR TO IDAHO WHEEL AND RIM COMPANY, OF BOISE, IDAHO.

DEMOUNTABLE WHEEL RIM.

Application filed March 1, 1927. Serial No. 171,784.

This invention relates particularly to means for fastening the rim of a pneumatic tire to the felloe.

The object of this invention resides in the provision of means for mounting the tire rim on a felloe in such a manner as to eliminate the use of a plurality of lugs, bolts and similar fastening means and at the same time provide an arrangement which is quickly removable or demountable in the event that removal or separation of the parts is necessary.

More specifically the invention resides in a pair of fixed interlocking lug members and another pair of interengaging lug members with quick adjustable fastening means whereby the release of the latter will permit the disengagement of all of the lugs.

Other features will more clearly hereinafter appear by reference to the drawings forming a part of the specification and wherein like characters of reference designate corresponding parts throughout the several views, in which Figure 1 is a side elevation of a wheel with the present invention included in the assembly.

Fig. 4 is a top plan view of the felloe showing the fixed lugs.

Fig. 5 is a similar view of the rim showing the lugs in dotted lines.

Fig. 6 is a side elevation of the rim, and

Fig. 7 is a transverse view through one of the fastening elements including a sliding lug.

Figure 1:
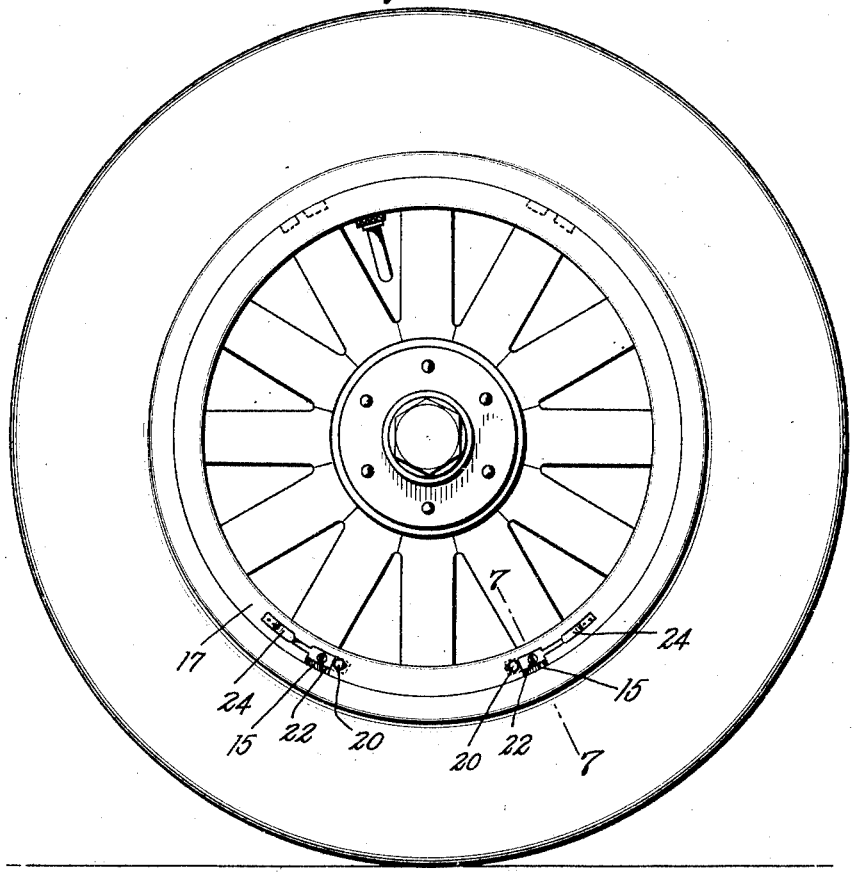

In the present arrangement, in assembling the rim on the felloe, it is essential that the fixed fastening elements be at the top in order that the coaction between the bevelled faces will produce the proper seating of the parts. These fixed fastening means in view of the foregoing will hereinafter be referred to as the upper fastening elements.

Referring now particularly to Figure 4, it will be noted that the portion of the fastening elements formed integral with the felloe comprise two sets of V-shaped spaced lugs 1, 2, 3 and 4 arranged on opposite sides of the annular felloe seat 5. The lugs 1 and 2 are spaced inward and on opposite sides as regards the lugs 3 and 4 and the opposite faces of each of the inner arms of these lugs are bevelled as at 5' and 6 for purposes hereinafter described. The lug members 3 and 4 have their inner adjacent faces 7 bevelled and also the faces 8.

The lugs 9 and 10 carried by the rim for engagement with the lugs 1, 2, 3 and 4 are V-shaped in design and have bevelled faces which coact with the bevelled faces of the felloe lugs.

Figure 2:
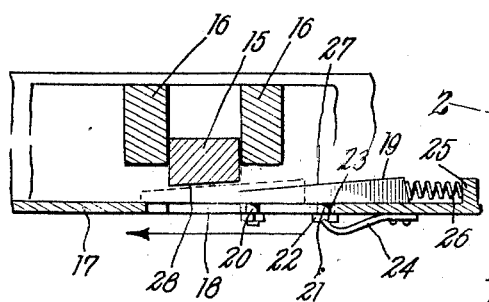
Fig. 2 is a transverse section through one of the lug assemblies showing the sliding lock.
Figure 3:
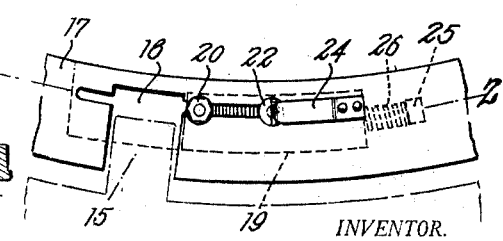
Fig. 3 is a side elevation of a portion of a rim and felloe with one of the fastening elements in retracted position.

The lower fastening means include spaced lugs 15 carried by the rim which are designed to be positioned between two sets of lugs 16 formed on the felloe. Figure 2 clearly illustrates the arrangement of one of these fastening assemblies and Figure 1 clearly defines the positioning of the fastenings. The felloe rim 17 is slotted as at 18 rearward of each lug 15 to facilitate the movement of the parts of the wedge clamp 19. The wedge clamp 19 is provided with a threaded tap 20 which extends through the slot 18. The tap 20 permits necessary adjustment of the wedge and acts as a forward guiding means for same. The lug 21 which projects through the slot is positioned substantially at the center of the wedge and is provided with an enlarged head 22 formed with a transverse groove 23 to permit the engagement of the spring clip 24 which retains its wedge in retracted position. An extension 25 which projects inwardly from the rim acts as a stop for the coil spring 26 which engages the outer end of the wedge member to normally cause the positioning of the bevelled face 27 of the wedge against the correspondingly bevelled face 28 of the lug 15.

To assemble the tire rim to the felloe the valve is first inserted into its proper hole, which should be centrally of the upper lug members. The tire rim when in this position is tilted on an angle, the bottom of the rim being a trifle away from the wheel. This action is in substance conventional to the positioning of the usual rim on a felloe. When in this position the lugs of the rim are being inserted in the recesses in the lugs of the felloe and because of the angular faces the coacting parts are automatically seated. The bottom portion of the rim is now forced into position so that the bottom lugs of the rim will be located between the base lugs on the felloe. The fastening wedges or bolts are then released and permitted to seat in their normal position under the tension of the springs which action prevents any lateral movement of the parts. By means of the foregoing structure it will be obvious that the rim is held in fixed relation with the felloe, the angular faces of the upper lugs and the arrangement of the lower lugs preventing circumferential movement or creeping of the parts and the wedges or bolts preventing lateral play.

What I claim as new and useful and desire to secure by Letters Patent, is:

In combination, a wheel felloe, a rim mounted on the felloe, first spaced interlocking lugs on the felloe and rim, second spaced interengaging lugs on the felloe and rim and spaced from the first lugs, said felloe having a side flange provided with slots to permit the passage of the second lugs of the rim, wedge blocks slidably mounted on said flange and adapted to extend across the slots for locking the second lugs of the rim to the felloe, guide pins for the wedge blocks sliding in said slots, one of said guide pins being threaded, and a nut engaging said threads for securing the wedge block in locking position.

In testimony whereof, I hereunto affix my signature.

THOMAS F. BOWLER.